(12) United States Patent
Lauwers

(10) Patent No.: US 6,460,359 B1
(45) Date of Patent: Oct. 8, 2002

(54) METHOD AND DEVICE FOR COOL-DRYING

(75) Inventor: Peter Albert Lauwers, Erps-Kwerps (BE)

(73) Assignee: Atlas Copco Airpower, nv, Wilrijk (BE)

( * ) Notice: Subject to any disclaimer, the term of this patent is extended or adjusted under 35 U.S.C. 154(b) by 0 days.

(21) Appl. No.: 09/700,701

(22) PCT Filed: May 11, 1999

(86) PCT No.: PCT/BE99/00059

§ 371 (c)(1),
(2), (4) Date: Nov. 24, 2000

(87) PCT Pub. No.: WO99/61135

PCT Pub. Date: Dec. 2, 1999

(30) Foreign Application Priority Data

May 26, 1998 (BE) .............................................. 9800397
Sep. 24, 1998 (BE) .............................................. 9800687

(51) Int. Cl.[7] .............................. F25B 1/00; F25B 49/00
(52) U.S. Cl. ...................... 62/227; 62/176.3; 62/176.6
(58) Field of Search ...................... 62/227, 226, 228.4, 62/229, 150, 176.1, 176.3, 176.6, 151, 156, 173

(56) References Cited

U.S. PATENT DOCUMENTS

| | | | | |
|---|---|---|---|---|
| 4,459,519 A | * | 7/1984 | Erdman ...................... 318/254 |
| 4,856,293 A | * | 8/1989 | Takahashi .................. 62/228.3 |
| 5,035,119 A | * | 7/1991 | Alsenz ........................ 62/225 |
| 5,065,593 A | * | 11/1991 | Dudley et al. ................ 62/182 |
| 5,203,179 A | * | 4/1993 | Powell ........................ 62/180 |
| 5,992,163 A | * | 11/1999 | Baruschke et al. ........... 62/156 |
| 6,029,465 A | * | 2/2000 | Bascobert .................... 62/227 |
| 6,161,393 A | * | 12/2000 | Bascobert .................... 62/156 |

* cited by examiner

Primary Examiner—Denise L. Esquivel
Assistant Examiner—Marc Norman
(74) Attorney, Agent, or Firm—Bacon & Thomas, PLLC

(57) ABSTRACT

The present invention concerns a method for cool-drying gas containing water vapor, whereby this gas is guided through the secondary part of a heat exchanger (1) whose primary part is the evaporator (2) of a cooling circuit (3) which also contains a compressor (5) which is driven by an electric motor (4), a condenser (6), an expansion means (7) between the outlet of the condenser (6) and the inlet of the evaporator (2), and whereby the above-mentioned cooling circuit (3) is thus controlled as a function of the load that the cooling capacity is adjusted without any ice being formed in the evaporator (2), characterized in that the cooling circuit is controlled by adjusting the rotational speed of the motor (4).

20 Claims, 2 Drawing Sheets

METHOD AND DEVICE FOR COOL-DRYING

BACKGROUND OF THE INVENTION

The present invention concerns a method for cool-drying gas containing water vapor, whereby this gas is guided through the secondary part of a heat exchanger whose primary part is the evaporator of a cooling circuit which also contains a compressor which is driven by an electric motor, a condenser, an expansion means between the outlet of the condenser and the inlet of the evaporator, and whereby the above-mentioned cooling circuit is thus controlled as a function of the load that the cooling capacity is adjusted without any ice being formed in the evaporator.

Such methods are used among others for drying compressed air.

Compressed air which is supplied by a compressor is in most cases saturated with water vapor or, in other words, has a relative humidity of 100%. This implies that there is condensation at the slightest decrease of temperature. The water of condensation causes corrosion in the pipes and tools, and the equipment will wear out prematurely.

That is why the compressed air is dried, which may be done in the above-mentioned manner, by means of cool-drying. Also other air than compressed air or other gases may be dried in this manner.

Cool-drying is based on the principle that, by lowering the temperature, moisture from the air or the gas condenses, after which the water of condensation is separated in the liquid separator and after which the air or the gas is heated again, as a result of which this air or this gas is no longer saturated. The heat is discharged by the cooling circuit in the evaporator.

The same applies to other gases than air, and each time air is referred to hereafter, the same also applies to other gases than air.

In practice, there is an ISO-standard which determines the possible dew point and the corresponding lowest air temperature for reference values.

SUMMARY OF THE INVENTION

In order to prevent the lowest air temperature from dropping below 0° C. and thus the evaporator from freezing up, a necessary condition is that the temperature of the evaporator is higher than 0° C.

According to known methods, to this end, the temperature is measured on the inlet of the evaporator, or, since there is a definite connection between the temperature of the evaporator and the pressure of the evaporator for a specific cooling liquid in the cooling circuit, the pressure is measured before or after the evaporator.

The cooling circuit is then controlled such that the temperature of the evaporator or the pressure of the evaporator has the required value, and for example the pressure of the evaporator coincides with a temperature which is situated a few degrees below the required lowest air temperature or LAT, but not below 0° C.

According to these known methods for cool-drying, the motor of the compressor of the cooling circuit which is driven at a constant frequency is switched on and off as a function of the temperature of the evaporator. If this pressure of the evaporator decreases too much, said motor is stopped. If the pressure of the evaporator subsequently increases too much as the expansion valve is still open, the motor is started again.

Such a regulation makes it possible for the compressor to be switched off when the load drops beneath the cooling capacity, as a result of which the energy consumption will decrease. The surplus of cooling capacity is stored in a thermal mass. However, this regulation is very disadvantageous as the compressor is continuously switched on and off in case of a small load, while also the pressure of the evaporator and the dew points fluctuate strongly. Moreover, the cool-dryer must be built relatively large.

Another known method consists in measuring the lowest air temperature (LAT) on the outlet of the secondary part of the heat exchanger and to switch off the motor of the compressor of the cooling circuit when the temperature threatens to drop below 0° C. This method, whereby the motor is thus also switched on and off, offers the same disadvantages as the preceding one.

Another possibility for regulating the pressure of the evaporator would consist in selecting an evaporator which is large enough and in carrying back hot gases on the outlet of the compressor to the inlet of the compressor by means of a bypass.

This regulation method is disadvantageous in that, since the compressor motor is continuously working, also when there is no load or when the load is low, the energy consumption is equal to the energy consumption at a nominal load, as the high and low pressure in the cooling circuit are continuously kept at a constant level.

The object of the invention is a method for cool-drying which does not have the above-mentioned and other disadvantages and which makes it possible to save energy in a simple manner, without any pressure variations in the cooling circuit and without much wear of the compressor and its motor.

In accordance with the invention, this object is accomplished in that the cooling circuit is controlled by adjusting the rotational speed of the motor.

Instead of switching the motor on or off, its speed is adjusted. By increasing the rotational speed of the motor, more mass flow of cooling liquid can be pumped round, and thus can be obtained a higher cooling output.

The temperature of the evaporator can be measured and the above-mentioned cooling circuit can be controlled as a function of the measured temperature of the evaporator.

According to another embodiment, the pressure of the evaporator can be measured and the above-mentioned cooling circuit can be controlled as a function of the measured pressure of the evaporator.

According to yet another embodiment, the lowest gas temperature (LAT) can be measured and the above-mentioned cooling circuit is controlled as a function of this lowest gas temperature (LAT).

According to yet another embodiment, the dew point temperature of the gas can be measured and the above-mentioned cooling circuit is controlled as a function of this dew point.

Preferably, the rotational speed of the motor is adjusted by modifying the frequency of the supply current.

According to a special embodiment of the invention, the ambient temperature is measured and the rotational speed of the motor is adjusted as a function of the measured ambient temperature.

At high ambient temperatures, whereby the air or the gas is also relatively warm and may contain more moisture than when it is cold, it is not necessary to cool it to 3° C. in the heat exchanger in order to obtain dry air. Thus, the energy consumption of the above-mentioned cool-dryers is too high, and they require relatively large and expensive components in order to supply the cooling output. By taking into account said ambient temperature, the required cooling output may be kept lower, such that the cool-dryer can be made less large.

Preferably, the rotational speed of the motor of the compressor is adjusted such that the lower air or gas temperature on the outlet of the evaporator is 20° C. lower than the measured ambient temperature, without dropping below 3° C., however.

It is assumed that, when the outgoing air or the outgoing gas has a relative humidity of 50%, the danger of corrosion in pipes and equipment is excluded, and the above-mentioned control device guarantees that said relative humidity will not be higher than 50%.

The invention also concerns a device for cool-drying or a cool-dryer which is particularly suitable for applying the above-mentioned method.

The invention in particular concerns a device for cool-drying, containing a heat exchanger whose primary part is the evaporator of a cooling circuit which also contains a compressor which is driven by an electric motor, a condenser, an expansion means between the outlet of the condenser and the inlet of the evaporator, a control device to control the above-mentioned motor and measuring means coupled thereto, whereas the secondary part of the heat exchanger is part of a pipe for the gas and a liquid separator is erected on the outlet of said heat exchanger, in said pipe, whereby the device contains means to adjust the rotational speed of the motor while the control device controls these means as a function of the value measured by the measuring means.

The measuring means may be provided on the cooling circuit and they may be means to measure the temperature of the evaporator or the pressure of the evaporator.

However, the measuring means may also be provided on the pipe for the gas, in the secondary part of the heat exchanger or downstream to it, and they may be means to measure the lowest gas temperature (LAT) or means to measure the dew point.

Preferably, the means for regulating the rotational speed of the motor consist of a frequency converter.

According to a special embodiment of the invention, the cool-dryer contains means for measuring the ambient temperature which are also coupled to the control device, and this control device is such that it adjusts the speed of the motor both as a function of the value measured by the measuring means and as a function of the temperature measured by the means for measuring the ambient temperature.

BRIEF DESCRIPTION OF THE DRAWINGS

In order to better explain the characteristics of the invention, the following preferred embodiments of a cool-dryer according to the invention are described as an example only without being limitative in any way, with reference to the accompanying drawings, in which.

DETAILED DESCRIPTION OF THE INVENTION

Figure 1:
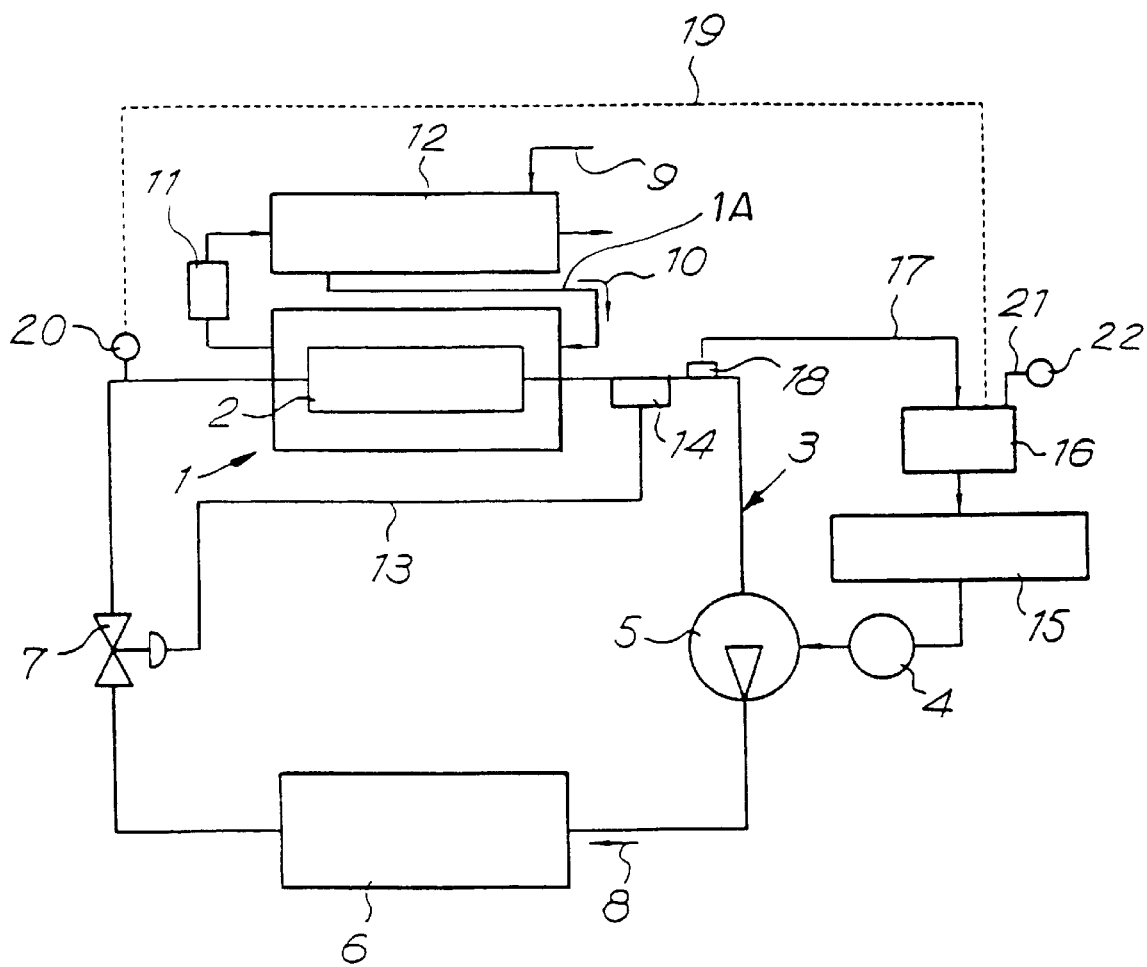
FIG. 1 represents a block diagram of a device for cool-drying according to the invention.

The device for cool-drying which is schematically represented in FIG. 1 mainly contains a heat exchanger 1 whose primary part forms the evaporator 2 of a cooling circuit 3 in which are also successively erected a compressor 5 driven by electric motor 4, a condenser 6 and an expansion valve 7.

This cooling circuit is filled with cooling fluid, for example freon 404a, whose direction of flow is represented by the arrow 8.

The secondary part 1A of the heat exchanger 1 is part of the pipe 9 for humid air to be dried, whose direction of flow is represented by the arrow 10.

After the heat exchanger 1, i.e. on its outlet, a liquid separator 11 is erected in the pipe 9.

Before it reaches the heat exchanger 1, this pipe 9 may possibly extend through a pre-cooler or recuperation heat exchanger 12 with one part and subsequently, after the liquid separator 11, extend again through the recuperation heat exchanger 12, counterflow to the above-mentioned part.

The heat exchanger 1 is a liquid/air heat exchanger and, from a constructional point of view, may form a whole with the possible recuperation heat exchanger 12 which is an air/air heat exchanger.

The expansion valve 7 is a thermostatic valve whose thermostatic element is coupled to a bulb 14 provided on the outlet of the evaporator 2 on the cooling circuit 3 by means of a copper guide 13 and which is filled with the same cooling liquid.

According to a variant which is not represented in the figure, this expansion valve is an electronic valve, however, which is coupled to a temperature gauge erected on the far end of the evaporator 2 or after it.

In small cool-dryers, the expansion valve 7 may be replaced by a capillary tube.

The compressor 5 is a volumetric compressor which supplies an almost invariable volume flow at an invariable rotational speed, for example a spiral compressor, whereas the motor 4 is an electric motor whose rotational speed can be adjusted by changing the frequency.

Also, this motor 4 is coupled to a frequency converter 15 which is controlled by a control device consisting of a built-in PID controller 16.

The frequency converter 15 may for example adjust the frequency between 0 and 400 Hz and forms means to adjust the rotational speed of the motor 4.

According to a first embodiment, the PID controller 16 is connected to a temperature measuring means 18 via a pipe 17 to measure the pressure of the evaporator, for example a pressure transmitter with a pressure range from −1 to 12 bar which transforms the pressure in an electric signal, in particular a current, which is erected on the inlet or the outlet of the evaporator 2, as is represented in the figure by means of a dashed line.

According to a second embodiment, the PID controller 16 is connected to the temperature measuring means 20 via a connecting means 19 to measure the temperature of the evaporator, for example a thermocouple in the cooling circuit 3, on the inlet of the evaporator 2 and thus between this evaporator 2 and the expansion valve.

Indeed, for a given cooling fluid, there is a definite connection between the temperature of the evaporator and the pressure of the evaporator. The higher the temperature, the higher the pressure. Strictly speaking, this connection is not linear, but in the field of operation, i.e. between 0° C. and 25° C., the deviation from a linear is to be practically neglected.

In both embodiments, the PID controller 16 is connected to an ambient temperature means 22 via a pipe 21 to measure the ambient temperature and which transforms this temperature into an electric signal, in particular a current.

The working of the cool-dryer is as follows:

The air to be dried is carried through the pipe 9 and thus through the heat exchanger 1, counterflow to the cooling fluid in the evaporator 2 of the cooling circuit 3.

In this heat exchanger 1, the damp air is cooled, as a result of which condensation is formed which is separated in the liquid separator 11.

The cold air, which contains less moisture after this liquid separator 11 but yet has a relative humidity of 100%, is heated in the recuperation heat exchanger 12, as a result of which the relative humidity decreases to about 50%, while the fresh air to be dried is already partly cooled in this heat exchanger 12 before being supplied to the heat exchanger 1.

The air on the outlet of the recuperation heat exchanger 12 is thus drier than on the inlet of the heat exchanger 1.

In order to prevent the evaporator 2 from freezing, the air in the heat exchanger 1 is not cooled below 3° C., which is the LAT for low ambient temperatures.

With higher ambient temperatures, the LAT may be higher and may be cooled to an LAT which is 20° C. lower than the ambient temperature, and in any case not below 3° C.

If the LAT is too high, this means that there is not enough cooling and thus not enough condensation of moisture to sufficiently dry the air.

Said LAT is situated 2 to 3° C. above the actual temperature of the evaporator which is measured by the measuring means 20.

The above-mentioned LAT conditions are met by adjusting the rotational speed of the motor 4 as a function of the temperature of the evaporator measured by the measuring means 20 by means of the PID controller 16 and the frequency converter 15 controlled by it in the one embodiment, or the pressure of the evaporator measured by the measuring means 18 in the other embodiment.

The cooling output is equal to the mass flow of cooling liquid circulating in the cooling circuit 3, multiplied by the enthalpy difference of the air before and after the heat exchanger 1. By increasing the rotational speed of the motor 4, the compressor 5 can pump round more mass flow, and thus can be supplied a larger output with the same enthalpy difference. The mass flow is the volume flow of the compressor 5, multiplied by the density of the cooling liquid in the suction condition, which itself depends on the temperature of the evaporator and the overheating.

The PID controller 16 adjusts the measured temperature or pressure by adjusting the rotational speed, so that this temperature is a few degrees lower than the above-mentioned LAT, but yet higher than 0° C., the pressure of the evaporator is reached respectively, which coincides with a temperature which is a few degrees lower than the LAT and which is for example equal to 1° C., whereby for freon R404a, the pressure of the evaporator is effectively about 5.2 bar.

In this manner, the cooling output is adjusted to the load.

As the means 22 also measure the ambient temperature, the PID controller 16 coupled to it can take this temperature into account.

By means of the PID controller 16 and the frequency converter 15 controlled by it, the rotational speed of the motor 4 is than adjusted such that, as long as the ambient temperature is low, in particular below 23° C., the above-mentioned condition is met and thus the LAT on the outlet of the secondary part 1A of the heat exchanger 1 is about 3° C., but at a higher ambient temperature, this LAT is 20° C. lower than the ambient temperature measured by the means 21.

The temperature of the evaporator has a set point which is a few degrees lower than the required LAT. The temperature which is obtained by subtracting some 22° C. from the ambient temperature, can be calibrated as the set point of the PID controller 16.

A minimum and a maximum set point may possibly be set in the PID controller 16, whereby the minimum is 1° C. When calibrating the PID controller 16, this set point can be adjusted for example via a control panel or via an analogous inlet.

The frequency is adjusted between for example 30 and 75 Hz.

The maximum load of the cool-drying device is relatively small, since, at higher ambient temperatures, the LAT can be higher than 3° C., as a result of which the cooling output decreases and the components may thus be less expensive and cooling fluid is saved on.

In the condenser 6, the cooling fluid which has been heated in the compressor 5 as a result of the compression, is cooled until it has a liquid state, whereby use can be made of a fan or of cooling water to discharge the heat to the environment.

When the pressure in the condenser 6 is too high, the motor 4 is automatically switched off.

After the condenser 6, the liquid cooling fluid may possibly be collected in a receptacle and/or it may be further cooled by an extra heat exchanger.

Thanks to the expansion valve 7, the liquid cooling fluid is expanded to a constant evaporator pressure, which of course results in a temperature decrease.

The expansion valve 7 only controls the overheating in the evaporator 2 and makes sure that the evaporator 2 is always optimally used, but it cannot be used to control the pressure of the temperature of the evaporator.

By applying a thermostatic expansion valve 7, there will always be overheating after the evaporator 2, so that there is no danger of cooling liquid entering the compressor 5, so that there is no need for a liquid separator in the cooling circuit 3 and so that the amount of cooling fluid is restricted.

This overheating is measured by subtracting the temperature measured by the bulb 14 from the temperature of the evaporator, either before the evaporator 2 (internal equalization) or after the evaporator (external equalization). This difference is compared to a predetermined value by the expansion valve 7 and, in case of a deviation, the expansion valve 7 will correct it by opening or by closing.

The degree of overheating has an influence on the LAT, but we may assume that this overheating is kept at a practically constant level by the expansion valve.

If necessary, this influence of the overheating can be taken into account by for example a sort of master/slave control circuit. The slave control circuit is the above-described control with the PID controller 16, whereas the master control circuit could adjust the set point of the pressure or temperature of the evaporator as a function of the actual LAT, and thus could for example lower the set point if the LAT remains too high as the overheating after the evaporator 2 is too high.

Although the pressure or temperature of the evaporator is adjusted by modifying the rotational speed, it may be possible to entirely switch off the motor 4 in case the load is zero, for example by placing a thermostatic sensor in the heat exchanger 1 which, should the temperature in the evaporator 2 drop to zero degrees, switches off the motor 4 and starts it again as soon as the temperature has risen to 3° C.

Figure 2:
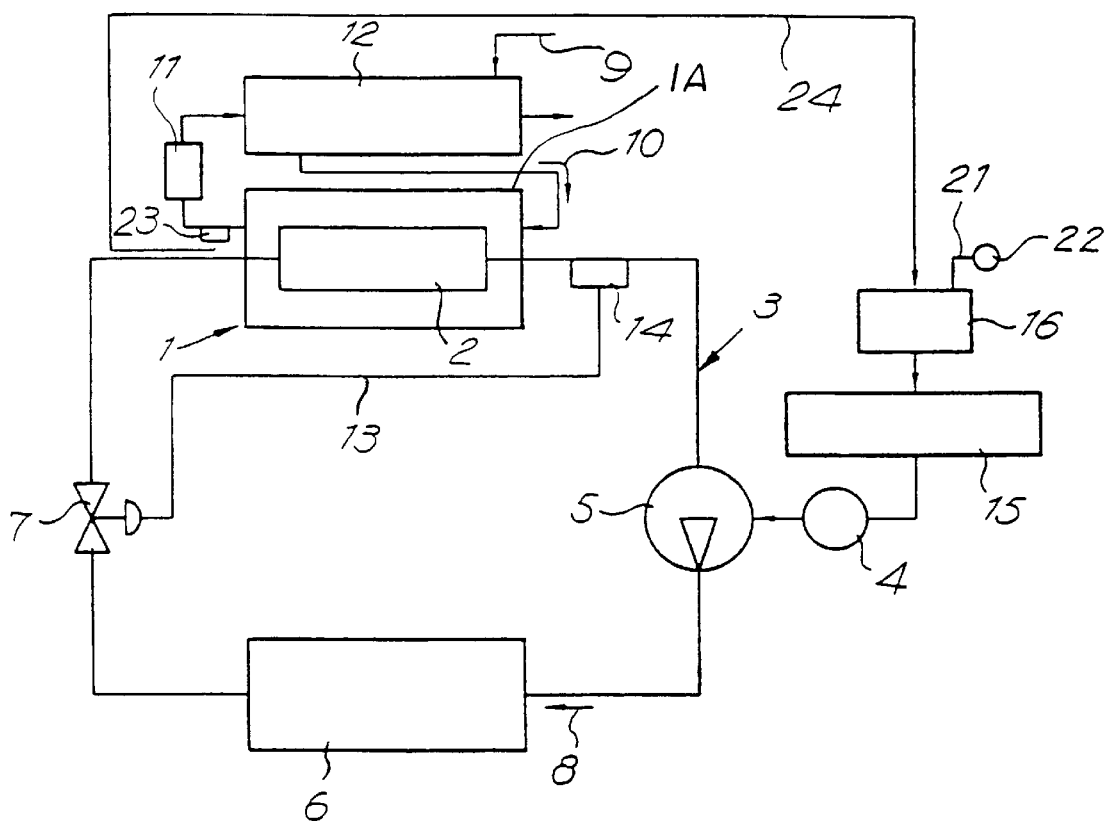
FIG. 2 represents a block diagram analogous to that of FIG. 1, but in relation to another embodiment of the invention.

The embodiment of the invention represented in FIG. 2 mainly differs from the above-described embodiments in that the measuring means 18 for measuring the pressure of the evaporator and/or the measuring means 20 for measuring the temperature of the evaporator provided on the cooling circuit 3 have been replaced by temperature measuring means 23 for measuring the lowest air temperature (LAT).

These measuring means 23 have been provided on the pipe 9, either in the secondary part 1A of the heat exchanger 1, for example on the surface of the evaporator 2, or as represented in FIG. 2, downstream the heat exchanger 1, for example between this heat exchanger 1 and the liquid separator 11.

The PID controller 16 is then connected to these measuring means 23 and to the means 22 for measuring the ambient temperature by means of a pipe 21.

In this embodiment, the PID controller 16 controls the frequency converter 15 and thus the rotational speed of the motor 4 as a function of the measured lowest air temperature LAT.

Measuring the LAT offers a major advantage in that the temperature of the cooling fluid may be lower than 0° C. without the evaporator thereby freezing up, i.e. before ice is formed on the air side of the evaporator, since this phenomenon is determined by the LAT.

Since with low evaporator temperatures, for example −5° C., on the side of the cooling fluid, and major temperature differences, for example of 8° C. (between +3° C. and −5° C.), there may be evaporation without any danger of freezing, the heat exchanger 1 can be made very compact.

If the measured lowest air temperature LAT rises or drops, the PID controller 16 will order the speed of the motor 4 to increase, decrease respectively, such that, as long as the ambient temperature measured by the temperature gauge 23 is low, in particular lower than 23° C., this measured LAT temperature will not drop below some 3° C., so as to make sure that the evaporator 2 will not freeze up.

Thanks to this control, the cooling is thus adjusted according to the load, whereby the evaporator temperatures on the side of the cooling fluid may drop below zero without the evaporator 2 freezing up on the air side, however. As a result, not only the energy consumption of the motor 4 is restricted to a minimum, but the heat exchanger 1 can be made relatively compact, which also implies savings on the cost of the device.

In this embodiment also, the overheating in the evaporator 2 is controlled by the expansion valve 7, as a result of which the cooling fluid expands.

Although the lowest air temperature is adjusted by modifying the rotational speed of the motor 4, it may be possible in this embodiment as well to entirely switch off the motor 4 in case of a zero load.

According to a variant of the preceding embodiment which is not represented in the figures, the measuring means 23 for measuring the lowest air temperature are replaced by measuring means for measuring the dew point of said air. Such measuring means or dew point gauges are available on the market and hence are not further described here.

Instead of the LAT, the dew point of the air is thus measured on the same place. The working is analogous to the above-described working, whereby the speed of the motor 4 is thus adjusted such that the cooling in the heat exchanger 1 is optimal, but the evaporator 2 is prevented from freezing up.

The invention is by no means limited to the above-described embodiments represented in the accompanying drawing; on the contrary, such a method and device for cool-drying can be made in all sorts of variants while still remaining within the scope of the invention.

In particular, instead of a PID controller 16, the control device may contain another controller, for example a PI or P controller. Although the ambient temperature is preferably also taken into account, among others to restrict the output of the device, it is possible, according to a simpler embodiment, to adjust the rotational speed of the motor 4 merely as a function of the evaporator temperature, the evaporator pressure, the lowest gas temperature or the dew point of the gas.

Instead of damp air, other gases than air containing water vapor can be dried in the same manner and with the same device. The LAT is then the lowest gas temperature.

I claim:

1. A method for cool-drying gas containing a water vapor, said gas being guided through a heat exchanger having primary and secondary parts, said primary part of said heat exchanger being an evaporator belonging to a cooling circuit having a cooling medium disposed therein that includes a compressor driven by a motor, a condenser, and an expansion device positioned between the outlet of the condenser and the inlet of the evaporator, said method comprising the steps of:

guiding the gas through the secondary part of the heat exchanger, said secondary part of the heat exchanger in communication with said primary part thereof;

cooling the gas as said gas passes through said heat exchanger;

controlling the temperature of the cooling circuit such that ice is not formed in the evaporator, said temperature being controlled by adjusting the rotational speed of the motor as a function of the measured temperature of the gas or the evaporator; and separating condensed water from said gas in a liquid separator as said gas exits said heat exchanger.

2. The method according to claim 1 further comprising the step of measuring the temperature of said evaporator such that said cooling circuit is controlled as a function of the measured evaporator temperature.

3. The method according to claim 2 wherein the rotational speed of the motor is adjusted such that the evaporator temperature is set 2 to 3° C. below the lowest gas temperature (LAT).

4. The method according to claim 2 wherein the temperature of the evaporator is measured at the inlet of the evaporator in said cooling circuit such that an evaporation temperature of the cooling medium within the cooling circuit is measured.

5. The method according to claim 1 further comprising the step of measuring the lowest gas temperature (LAT) such that the temperature of the cooling circuit is controlled as a function of the lowest gas temperature (LAT).

6. The method according to claim 5 wherein the lowest gas temperature (LAT) is measured at the outlet of the secondary part of the heat exchanger.

7. The method according to claim 1 further comprising the step of measuring the dew point of the gas such that the temperature of the cooling circuit is controlled as a function of the dew point of the gas.

8. The method according to claim 1 wherein the cooling circuit is controlled such that the temperature along a side of the evaporator in communication with the cooling medium drops below zero without said evaporator freezing along another side thereof in communication with said gas.

9. The method according to claim 1 wherein the rotational speed of the motor is adjusted by modifying the frequency of a supply current.

10. The method according to claim 1 further comprising the step of measuring the ambient temperature, wherein the rotational speed of the motor is adjusted on the basis of the measured ambient temperature.

11. The method according to claim 10 further comprising the step of adjusting the rotational speed of the motor of the compressor such that the lowest adjustable temperature (LAT) on the outlet evaporator is set between 3° C. and 20° C. below the measured ambient temperature.

12. The method according to claim 1 further comprising the step of expanding the cooling medium in an expansion valve before the cooling medium enters the evaporator, wherein overheating of the cooling medium is measured after said cooling medium passes through the evaporator and is compared to a predetermined value such that in the event of a deviation between the predetermined value and the measured value, said expansion valve either opens or closes depending upon the degree of deviation.

13. The method according to claim 1 further comprising the step of drying said gas in a recuperation heat exchanger after said gas passes through said heat exchanger and said liquid separator.

14. A cool-drying device configured to cool-dry a gas containing a water vapor, said device comprising:

a heat exchanger having primary and secondary parts;

said primary part being an evaporator belonging to a cooling circuit having a cooling medium disposed therein that includes a compressor driven by a motor, a condenser, an expansion device positioned between the outlet of the condenser and the inlet of the evaporator, and a temperature measuring device; and said secondary part including a pipe in communication with said primary part of said heat exchanger and arranged for said gas to flow therethrough, and a liquid separator positioned along said pipe after said pipe exits said evaporator;

an adjustment device arranged to adjust the rotational speed of said motor; and a control device arranged to control said adjustment device as a function of the temperature of said gas or the evaporator as measured by said temperature measuring device.

15. The device according to claim 14 wherein the temperature measuring device is positioned in said cooling circuit and is arranged to measure the temperature in said evaporator.

16. The device according to claim 14 wherein the temperature measuring device is positioned along said pipe in cooperation with the gas in or downstream said secondary part, said temperature measuring device measuring the lowest gas temperature (LAT).

17. The device according to claim 14 wherein said temperature measuring device is provided along the pipe in cooperation with the gas in or downstream said secondary part of the heat exchanger, said temperature measuring device measuring the dew point of said gas.

18. The device according to claim 14 wherein the adjustment device includes a frequency converter.

19. The device according to claim 14 further comprising an ambient temperature measuring device arranged to measure the ambient temperature near said cool-drying device and coupled to the control device, said control device adjusting the rotational speed of the motor as a function of the values measured by said temperature measuring device and the ambient temperature measuring device.

20. The device according to claim 14 wherein the control device is a PID control, a PI control or a P control.

* * * * *